US011589326B2

(12) United States Patent
Nair et al.

(10) Patent No.: US 11,589,326 B2
(45) Date of Patent: Feb. 21, 2023

(54) SECURE CLOCK SOURCE AS A SERVICE IN A COMMUNICATION SYSTEM

(71) Applicant: Nokia Technologies Oy, Espoo (FI)

(72) Inventors: Suresh Nair, Whippany, NJ (US); Betsy Covell, Chicago, IL (US)

(73) Assignee: Nokia Technologies Oy, Espoo (FI)

( * ) Notice: Subject to any disclaimer, the term of this patent is extended or adjusted under 35 U.S.C. 154(b) by 186 days.

(21) Appl. No.: 16/943,880

(22) Filed: Jul. 30, 2020

(65) Prior Publication Data

US 2022/0039040 A1 Feb. 3, 2022

(51) Int. Cl.
*H04L 29/06* (2006.01)
*H04W 56/00* (2009.01)
*H04W 12/06* (2021.01)
*H04W 12/10* (2021.01)

(52) U.S. Cl.
CPC ....... *H04W 56/0015* (2013.01); *H04W 12/06* (2013.01); *H04W 12/10* (2013.01)

(58) Field of Classification Search
None
See application file for complete search history.

(56) References Cited

U.S. PATENT DOCUMENTS

| 9,838,236 | B2 * | 12/2017 | Bogdan | H04L 7/0016 |
| 2007/0266256 | A1 * | 11/2007 | Shah | H04L 63/12 |
| | | | | 713/178 |
| 2008/0168544 | A1 * | 7/2008 | von Krogh | G06F 21/445 |
| | | | | 713/400 |
| 2017/0293763 | A1 * | 10/2017 | Shear | G06F 21/53 |
| 2019/0238555 | A1 * | 8/2019 | Buffard | H04L 63/068 |

FOREIGN PATENT DOCUMENTS

WO PCT/IB2021/056754 10/2021

OTHER PUBLICATIONS

Wang, Heng et al. Clock Skew Estimation of Listening Nodes with Clock Correction upon Every Synchronization in Wireless Sensor Networks. IEEE Signal Processing Letters, vol. 22, Issue: 12. https://ieeexplore.ieee.org/stamp/stamp.jsp?tp=&arnumber=7299293 (Year: 2015).*

(Continued)

*Primary Examiner* — Jeremiah L Avery
(74) *Attorney, Agent, or Firm* — Ryan, Mason & Lewis, LLP (57) ABSTRACT

Techniques for providing a secure clock source in a communication network are disclosed. For example, a method comprises participating in a bi-directional authentication with a network entity in a communication network, sending a clock service request message to the network entity, receiving a clock service accept message in response to the clock service request message when the apparatus is eligible to use a clock service, and receiving one or more secure clock signals from the network entity. Another method comprises participating in a bi-directional authentication with a requesting device in a communication network, receiving a clock service request message from the requesting device, verifying the eligibility of the requesting device to request a clock service, and sending one or more secure clock signals to the requesting device in response to successfully verifying the requesting device.

28 Claims, 6 Drawing Sheets

(56) References Cited

OTHER PUBLICATIONS

He, Debiao et al. An Efficient Identity-Based Conditional Privacy-Preserving Authentication Scheme for Vehicular Ad Hoc Networks. IEEE Transactions on Information Forensics and Security, vol. 10, Issue: 12. https://ieeexplore.ieee.org/stamp/stamp.jsp?tp=&arnumber=7230279 (Year: 2015).*

Shahrak, Mehrdad Zaker et al. Two-way real time multimedia stream authentication using physical unclonable functions. 2016 IEEE 18th International Workshop on Multimedia Signal Processing (MMSP). https://ieeexplore.ieee.org/stamp/stamp.jsp?tp=&arnumber=7813398 (Year: 2016).*

Fan, Chun-I et al. Nested One-Time Secret Mechanisms for Fast Mutual Authentication in Mobile Communications. 2007 IEEE Wireless Communications and Networking Conference. https://ieeexplore.ieee.org/stamp/stamp.jsp?tp=&arnumber=4224749 (Year: 2007).*

Langer, Martin et al. Guards and Watchdogs in One-Way Synchronization with Delay-Related Authentication Mechanisms. 2019 IEEE International Symposium on Precision Clock Synchronization for Measurement, Control, and Communication (ISPCS). https://ieeexplore.ieee.org/stamp/stamp.jsp?tp=&arnumber=8886633 (Year: 2019).*

3GPP, "3rd Generation Partnership Project; Technical Specification Group Services and System Aspects; Security Architecture and Procedures for 5G System (Release 16)," 3GPP TS 33.501 V16.3.0, Jul. 2020, 248 pages.

3GPP, "3rd Generation Partnership Project; Technical Specification Group Services and System Aspects; System Architecture for the 5G System (5GS); Stage 2 (Release 16)," 3GPP TS 23.501 V16.5.0, Jul. 2020, 441 pages.

3GPP, "3rd Generation Partnership Project; Technical Specification Group Services and System Aspects; Service Requirements for Cyber-Physical Control Applications in Vertical Domains; Stage 1 (Release 17)," 3GPP TS 22.104 V17.3.0, Jul. 2020, 76 pages.

Anonymous, "New Milestone in Network Time Security as Internet Draft Approved / Netnod," https://www.netnod.se/time-and-frequency/new-milestone-in-network-time-security-as-internet_draft_approved, Mar. 27, 2020, 2 pages.

D. Franke et al., "Network Time Security for the Network Time Protocol draft-ietf-ntp-using-nts-for-ntp-28," NTP Working Group, Internet-Draft, https://tools.ietf.org/pdf/draft-ietf-ntp-using-nts-for-ntp-28.pdf, Mar. 25, 2020, 50 pages.

D. Mills et al., "Network Time Protocol Version 4: Protocol and Algorithms Specification," Internet Engineering Task Force (IETF), Request for Comments: 5905, https://www.rfc-editor.org/rfc/pdfrfc/rfc5905.txt.pdf, Jun. 2010, 110 pages.

Hans Weibel, "Technology Update on IEEE 1588: The Second Edition of the High Precision Clock Synchronization Protocol," http://www.ines.zhaw.ch/fileadmin/user_upload/engineering/_Institute_und_Zentren/INES/Downloads/Technology_Update_IEEE1588_v2.pdf, Jan. 1, 2009, 8 pages.

* cited by examiner

| SERVICE NAME | DESCRIPTION |
|---|---|
| Ncsf_CSSession | THIS SERVICE MANAGES THE CLOCK SERVICE SESSIONS AND USES THE POLICY AND CHARGING RULES RECEIVED FROM THE PCF. THE SERVICE OPERATIONS EXPOSED BY THIS NF SERVICE ALLOWS THE CONSUMER NFs TO HANDLE THE CLOCK SERVICE SESSIONS. |
| Ncsf_EventExposure | THIS SERVICE EXPOSES THE EVENTS HAPPENING ON THE CSF SESSIONS TO THE CONSUMER NFs. |
| Ncsf | THIS SERVICE IS USED FOR CLOCK SIGNAL/DATA TRANSFER BETWEEN CSF AND ANOTHER NF. |

| USER-SPECIFIC CLOCK SYNCHRONICITY ACCURACY LEVEL | NUMBER OF DEVICES IN ONE COMMUNICATION GROUP FOR CLOCK SYNCHRONIZATION | 5GS SYNCHRONICITY BUDGET REQUIREMENT (NOTE) | SERVICE AREA | SCENARIO | APPLICATION SPECIFIC CLOCK SERVICE APIs |
|---|---|---|---|---|---|
| 1 | UP TO 300 UEs | ≤ 900 ns | ≤ 100 m × 100 m | MOTION CONTROL CONTROL-TO-CONTROL COMMUNICATION FOR INDUSTRIAL CONTROLLER | API #1 |
| 2 | UP TO 300 UEs | ≤ 900 ns | ≤ 1000 m × 100 m | CONTROL-TO-CONTROL COMMUNICATION FOR INDUSTRIAL CONTROLLER | API #2 |
| 3 | UP TO 10 UEs | < 10 µs | ≤ 2500 m² | HIGH DATA RATE VIDEO STREAMING | API #3 |
| 3a | UP TO 100 UEs | < 1 µs | ≤ 10 km² | AVProd SYNCHRONIZATION AND PACKET TIMING | API #4 |
| 4 | UP TO 100 UEs | < 1 µs | < 20 km² | SMART GRID: SYNCHRONICITY BETWEEN PMUs | API #5 |
| 5 | UP TO 10 UEs | < 50 µs | 400 km | TELESURGERY AND TELEDIAGNOSIS | API #6 |
| 6 | FOR APPLICATION SERVERS | DIFFERENT CLOCK ACCURACY IN NANO SECOND, MICRO SECOND, MILLI SECOND etc. | | HIGH ACCURACY STOCK TRADING FOR TRADING PLATFORMS | API #7 |

NOTE: THE CLOCK SYNCHRONICITY REQUIREMENT REFERS TO THE CLOCK SYNCHRONICITY BUDGET FOR THE 5G SYSTEM.

SECURE CLOCK SOURCE AS A SERVICE IN A COMMUNICATION SYSTEM

FIELD

The field relates generally to communication systems, and more particularly, but not exclusively, to security management of clock sources within such systems.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point of an access network referred to as a 5G AN in a 5G network. The access point (e.g., gNB) is illustratively part of an access network of the communication system. For example, in a 5G network, the access network referred to as a 5G AN is described in 5G Technical Specification (TS) 23.501, entitled "Technical Specification Group Services and System Aspects; System Architecture for the 5G System," the disclosure of which is incorporated by reference herein in its entirety. In general, the access point (e.g., gNB) provides access for the UE to a core network (CN or 5GC), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. However, due to continuing attempts to improve the architectures and protocols associated with a 5G network in order to increase network efficiency and/or subscriber convenience, security management issues associated with clock sources provided by a communication system as a service can present a significant challenge.

SUMMARY

Illustrative embodiments provide techniques for providing a secure clock source in a communication network.

For example, in one illustrative embodiment, a method comprises participating in a bi-directional authentication with a network entity in a communication network, sending a clock service request message to the network entity, receiving a clock service accept message in response to the clock service request message when the apparatus is eligible to use a clock service, and receiving one or more secure clock signals from the network entity.

In another illustrative embodiment, a method comprises participating in a bi-directional authentication with a requesting device in a communication network, receiving a clock service request message from the requesting device, verifying the eligibility of the requesting device to request a clock service, and sending one or more secure clock signals to the requesting device in response to successfully verifying the requesting device.

Further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

DETAILED DESCRIPTION

Embodiments will be illustrated herein in conjunction with example communication systems and associated techniques for security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.501 and 3GPP TS 33.501. Other 3GPP TS/TR documents may provide other conventional details that one of ordinary skill in the art will realize. For example, 3GPP TS 22.104, entitled "Technical Specification Group Services and System Aspects; Service Requirements for Cyber-Physical Control Applications in Vertical Domains; Stage 1," the disclosure of which is incorporated by reference herein in its entirety, may also be mentioned below in the context of some illustrative embodiments.

However, while well-suited for 5G-related 3GPP standards, embodiments are not necessarily intended to be limited to any particular standards.

Illustrative embodiments are related to security management for clock sources in 5G networks. Prior to describing such illustrative embodiments, a general description of main components of a 5G network will be described below in the context of FIGS. 1 and 2.

Figure 1:
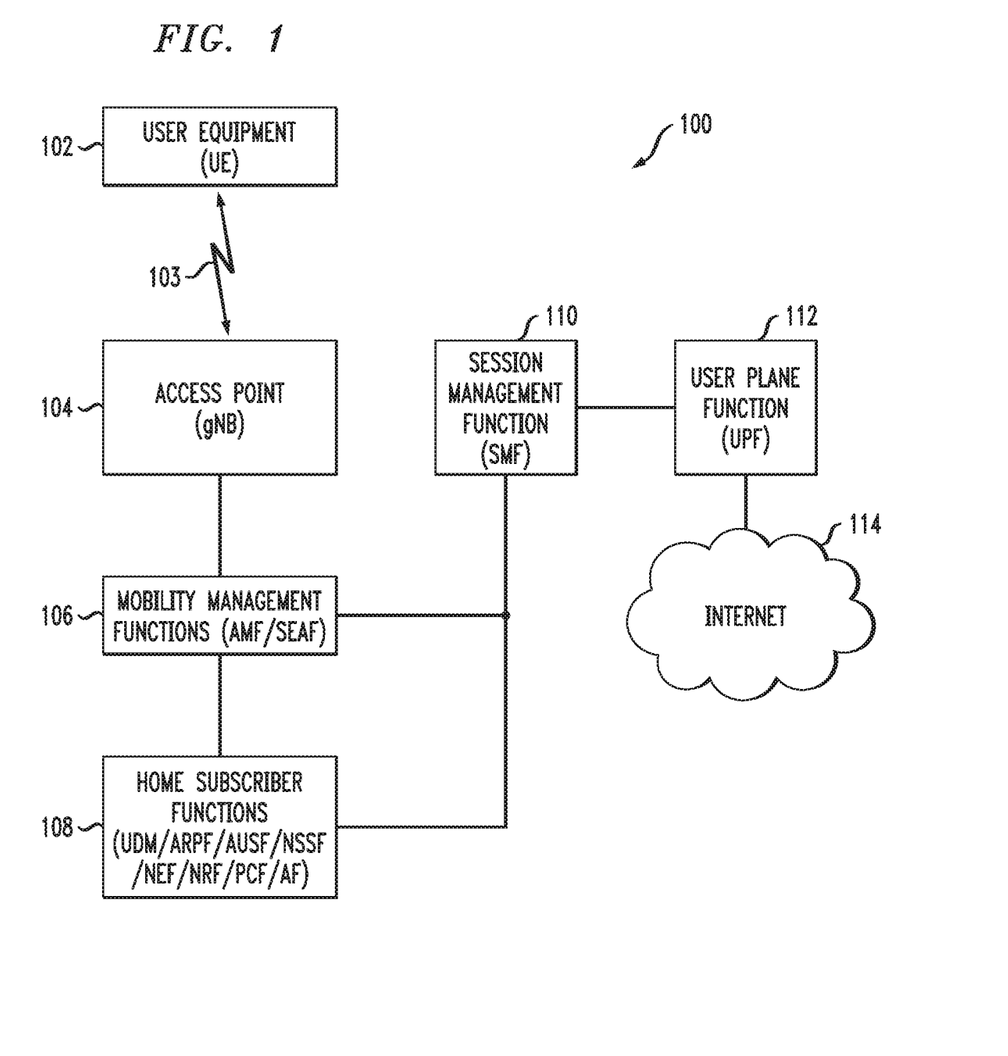
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, at least some functions that facilitate an explanation of illustrative embodiments are represented. Subsequent figures may depict some additional elements/functions (i.e., network entities).

Accordingly, as shown, communication system 100 comprises user equipment (UE) 102 that communicates via an air interface 103 with an access point (gNB) 104. The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores a permanent subscription identifier and its related key, which are used to uniquely identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) unique to the UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as Subscription Concealed Identifier (SUCI).

Another example of a SUPI uses a Network Access Identifier (NAI). NAI is typically used for IoT communication.

The access point 104 is illustratively part of an access network of the communication system 100. Such an access network may comprise, for example, a 5G System having a plurality of base stations and one or more associated radio network control functions. The base stations and radio network control functions may be logically separate entities, but in a given embodiment may be implemented in the same physical network element, such as, for example, a base station router or cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) can also be implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF may also be referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) may also be referred to herein, more generally, as an authentication entity or authentication entities. Further, an Authentication Credential Repository and Processing Function (ARPF) can be utilized in conjunction with the UDM. In addition, home subscriber functions may also include, but are not limited to, Network Slice Selection Function (NSSF), Network Exposure Function (NEF), Network Repository Function (NRF), Policy Control Function (PCF), and Application Function (AF).

Note that a UE, such as UE 102, is typically subscribed to what is referred to as a Home Public Land Mobile Network (HPLMN) or a Standalone Non Public Network (SNPN) in which some or all of the home subscriber functions 108 reside. If the UE is roaming (not in the HPLMN), it is typically connected with a Visited Public Land Mobile Network (VPLMN) also referred to as a visited or serving network. Some or all of the mobility management functions 106 may reside in the VPLMN, in which case, functions in the VPLMN communicate with functions in the HPLMN as needed. However, in a non-roaming scenario, mobility management functions 106 and home subscriber functions 108 can reside in the same communication network. Furthermore, one or more of subscriber functions 108 can be part of a VPLMN if appropriate in certain circumstances. Embodiments described herein are not limited by which functions reside in which PLMN (i.e., HPLMN or VPLMN).

The access point 104 is also operatively coupled (via one or more of functions 106 and/or 108) to a serving gateway function, i.e., Session Management Function (SMF) 110, which is operatively coupled to a User Plane Function (UPF) 112. UPF 112 is operatively coupled to a Packet Data Network, e.g., Internet 114. Further typical operations and functions of such network elements are not described here since they are not the focus of the illustrative embodiments and may be found in appropriate 3GPP 5G documentation. Note that functions shown in 106, 108, 110 and 112 are examples of network functions (NFs).

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
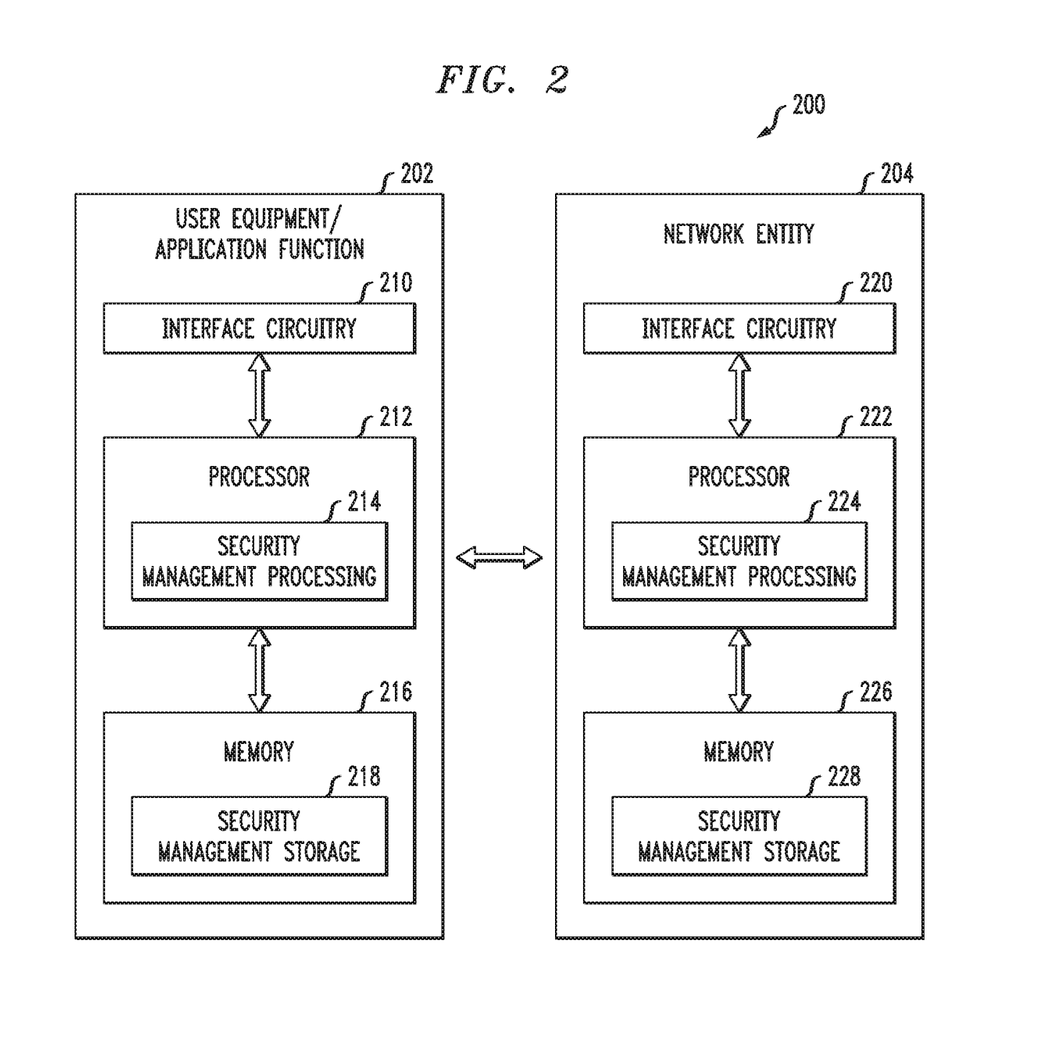
FIG. 2 illustrates user equipment, an application function, and a network entity with which one or more illustrative embodiments may be implemented.

FIG. 2 is a block diagram of user equipment or an application function ("user equipment/application function") and a network entity for providing authenticated clock source services in a communication system in an illustrative embodiment. System 200 is shown comprising user equipment 202 and a network entity 204.

It is to be appreciated that block 202 as "user equipment" represents one example of UE 102 described above in the context of FIG. 1, and as an "application function" represents one or more application servers that provide one or more application functionalities to the UE and/or one or more network entities of the communication network. It is to be further appreciated that while the network entity 204 can represent any network entities (network functions, nodes, components, elements, services, etc.) that are configured to provide security management and other techniques described herein, for example, but not limited to, AMF, SEAF, UDM, ARPF, AUSF, NSSF, NEF, NRF, PCF and AF such as are part of an SBA-based 5G core network (which is part of an HPLMN, VPLMN, or both), network entity 204 represents a Clock Services Function (CSF) as introduced herein and as will be further explained in accordance with one or more illustrative embodiments.

Network entity 204 can also be a network function, node, component, element, service, etc., external to the SBA-based 5G core network, i.e., a third-party external enterprise network. Further, network entity 204 can represent one or more processing devices configured to orchestrate and manage instantiation of one or more network functions (or other security management entities) within an SBA-based 5G core network or any communication network. Instantiation of a network function is described in the various 3GPP standards and otherwise well known to those of ordinary skill in the art.

User equipment/application function 202 comprises a processor 212 coupled to a memory 216 and interface circuitry 210. The processor 212 of user equipment 202 includes a security management processing module 214 that may be implemented at least in part in the form of software executed by the processor. The processing module 214 performs operations associated with security management as described in conjunction with subsequent figures and otherwise herein. The memory 216 of user equipment/application function 202 includes a security management storage module 218 that stores data generated or otherwise used during security management operations.

The network entity 204 comprises a processor 222 coupled to a memory 226 and interface circuitry 220. The processor 222 of the network entity 204 includes a security management processing module 224 that may be implemented at least in part in the form of software executed by the processor 222. The processing module 224 performs operations associated with security management as described in conjunction with subsequent figures and otherwise herein. The memory 226 of the network entity 204 includes a security management storage module 228 that stores data generated or otherwise used during security management operations.

The processors 212 and 222 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments. In addition, illustrative embodiments may be realized in a completely virtualized environment using software, running on a cloud platform, to emulate the various network functions.

The memories 216 and 226 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 illustratively comprise transceivers or other communication hardware or firmware that allows the associated system elements to communicate with one another in the manner described herein.

It is apparent from FIG. 2 that user equipment/application function 202 is configured for communication with network entity 204 and vice-versa via their respective interface circuitries 210 and 220. This communication involves user equipment/application function 202 sending data to the network entity 204, and the network entity 204 sending data to the user equipment/application function 202. However, in alternative embodiments, other network elements may be operatively coupled between user equipment/application function 202 and network entity 204. The term "data" as used herein is intended to be construed broadly, so as to encompass any type of information that may be sent between user equipment and a network entity, as well as between network entities, including, but not limited to, messages, identifiers, keys, indicators, user data, control data, etc.

It is to be appreciated that the particular arrangement of components shown in FIG. 2 is an example only, and numerous alternative configurations may be used in other embodiments. For example, any given network entity can be configured to incorporate additional or alternative components and to support other communication protocols.

Other system elements such as gNB 104 may each also be configured to include components such as a processor, memory and network interface. These elements need not be implemented on separate stand-alone processing platforms, but could instead, for example, represent different functional portions of a single common processing platform.

Still further, while FIG. 2 illustrates example architectures and interconnectivity between user equipment and a network entity, FIG. 2 can also represent example architectures and interconnectivity between multiple network entities (e.g., 202 can represent one network entity operatively coupled to another network entity in the form of network entity 204). More generally, FIG. 2 can be considered to represent two processing devices configured to provide respective security management functionalities and operatively coupled to one another in a communication system.

Figure 3:
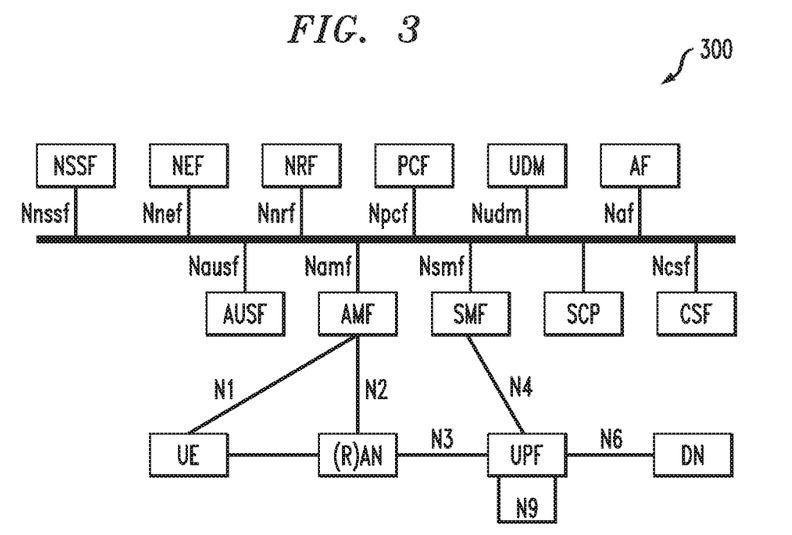
FIG. 3 illustrates a service-based communication system architecture adapted with an authenticated clock source function, according to one or more illustrative embodiments.

The architecture for 5G systems is currently being standardized in 3GPP. As mentioned above, the 3GPP TS 23.501 defines the 5G system architecture as service-based, e.g., Service-Based Architecture (SBA). FIG. 3 illustrates a general 5G SBA implementation 300 as further described in 3GPP TS 23.501. Note that the network entities (elements/functions) in FIG. 3 are the same or similar to those described above in the context of FIGS. 1 and 2. The notation of a capital "N" in front of the network entity name (e.g., Nausf) denotes the SBA-based interface within the core network used to access the particular network entity (e.g., AUSF). Note also that, as shown, 5G SBA implementation 300 is adapted to include a CSF (with SBA-based interface Ncsf) in accordance with one or more illustrative embodiments. Functionalities of CSF will be further explained herein.

It is realized herein that in deploying different NFs, as depicted in FIG. 3, there can be many situations where an NF may need to interact with an entity external to the SBA-based 5G core network (e.g., including the corresponding PLMN(s), e.g., HPLMN and VPLMN). Thus, the term "internal" as used herein illustratively refers to operations and/or communications within the SBA-based 5G core network (e.g., SBA-based interfaces) and the term "external" illustratively refers to operations and/or communications outside the SBA-based 5G core network (non-SBA interfaces). By way of example only, AUSF may need to interact with an authentication, authorization, and accounting (AAA) server managed by a third-party enterprise ("third-party" here illustratively refers to a party other than the network operator of the SBA-based 5G core network). Using conventional 5G approaches, this results in AUSF supporting multiple services both internally and externally at the same time. Internally, AUSF may provide services to AMF, SMF, NEF, UDM, etc., while at the same time interacting with an external AAA server (e.g., an external NF configured for network slice authentication) which may be owned and operated by a third-party entity. More generally, in a 5G core network, each NF provides a defined set of services (acting as service producers) to other NFs (service consumers). Each NF can be a service producer for one service and service consumer for another service. An application server (e.g., 202 in FIG. 2) may be considered as an example of an external function, whether or not it is managed by a third party.

It is realized herein that it would be advantageous to provide functionalities in a 5G communication system that satisfy clock synchronization requirements (key performance indicators), e.g., including, but not limited to:

(i) Clock synchronicity, or time synchronization precision, is defined between a sync master and a sync device. The requirement on the synchronicity budget for the 5G system is the time error contribution between ingress and egress of the 5G system on the path of clock synchronization messages.

(ii) A 5G system mechanism to process and transmit IEEE1588v2/Precision Time Protocol messages to support third party applications which use this protocol.

(iii) A 5G system mechanism to synchronize the user-specific time clock of UEs with a global clock.

(iv) A 5G system mechanism to synchronize the user-specific time clock of UEs with a working clock.

(v) A 5G system supporting two types of synchronization clocks, the global time domain and the working clock domains.

(vi) A 5G system supporting networks with up to 128 working clock domains (with different synchronization domain identifiers/domain numbers), including for UEs connected through the 5G network. The domain number (synchronization domain identifier) is defined with one octet in IEEE 802.1AS, entitled "IEEE Standard for Local and Metropolitan Area Networks—Timing and Synchronization for Time-Sensitive Applications," the disclosure of which is incorporated by reference herein in its entirety.

(vii) A 5G system supporting up to four simultaneous synchronization domains on a UE. The four synchronization domains can be used, for example, as two synchronization domains for global time and two working clock domains. One pair of global time and working clock can be used as redundant synchronization domains for zero failover time.

(viii) A synchronicity budget for the 5G system within the global time domain not exceeding 900 nanoseconds (ns). The global time domain requires in general a precision of 1 microsecond (μs) between the sync master and any device of the clock domain. Some use cases require only a precision of ≤100 μs for the global time domain if a working clock domain with precision of ≤1 μs is available.

(ix) A synchronicity budget for the 5G system within a working clock domain not exceeding 900 ns. The working clock domains require a precision of ≤1 μs between the sync master and any device of the clock domain. Different working clock domains can be independent and can have different precision. The synchronicity budget for the 5G system is also applicable when the flow of clock synchronization messages traverses the air interface twice.

(x) A 5G system providing a media dependent interface for one or multiple 802.1AS sync domains.

(xi) A 5G system providing an interface to the 5G sync domain which can be used by applications to derive their working clock domain or global time domain (reference clock model).

(xii) A 5G system providing an interface at the UE to determine and to configure the precision and time scale of the working clock domain.

(xiii) A 5G system supporting arbitrary placement of sync master functionality and sync device functionality in integrated 5G/non-3GPP time sensitive networking (TSN) networks.

(xiv) A 5G system supporting clock synchronization through the 5G network if the sync master and the sync devices are served by different UEs. Flow of clock synchronization messages is in either direction, i.e., uplink (UL) and downlink (DL).

(xv) A 5G system providing a suitable means to support the management of the merging and separation of working clock domains, that is interoperable with the corresponding mechanisms of TSN and IEEE 802.1AS.

Illustrative embodiments overcome the above and other challenges as well as address the above-mentioned and other clock synchronization requirements by providing, in a 5G network (5GS), accurate timing (clock) as a new terrestrial service by defining parameters for this service comprising: an architectural framework such as a new NF, i.e., a Clock Services Function (CSF), dedicated to offer the clock service; the network supports a framework to request this service and offer this service to its clients in a secure manner; the clock signal or message containing the clock information to the clients is provided to the clients in an authenticated and integrity-protected (secure) manner to prevent any clock spoofing threat; devices/users (clients of the clock signal) are able to verify the authenticity of the clock source within the 5G network; the network is able to specifically authenticate the devices to receive the clock signals against a subscription; the network is able to offer different levels of clock accuracy as a service, such as, for example, clock signals having nanosecond, microsecond, millisecond or second accuracies; the network offers different APIs, to request the service for different timing accuracy (granularity), timing intervals (periodicity), etc; 5GS is able to expose the clock service even to third party application servers through a standardized interface such as NEF; 5GS may expose the clock service over any type of the access interfaces it supports such as wireless, wireline, etc.

Recall that FIG. 3 depicts a new NF referred to as a Clock Services Function (CSF) which is configured to offer clock services in the 5G core network over a new SBA interface referred to as Ncsf, in accordance with illustrative embodiments. CSF is defined in accordance with one or more illustrative embodiments in the context of FIGS. 4, 5 and 6.

Figure 4:
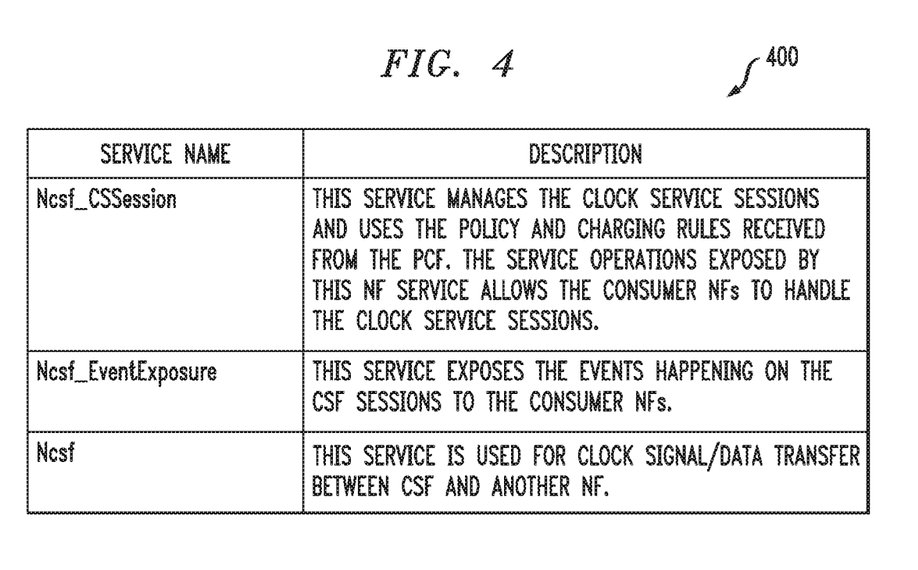
FIG. 4 illustrates a table of service definition types for a clock services function, according to one or more illustrative embodiments.

FIG. 4 illustrates a table 400 of service definition types for CSF, according to one or more illustrative embodiments. More particularly, Ncsf_CSSession is a service that manages the Clock Service Sessions and uses the policy and charging rules received from the PCF. The service operations exposed by this NF service allows the consumer NFs to handle the Clock Service Sessions. Ncsf_EventExposure is a service that exposes the events happening on the CSF Sessions to the consumer NFs. Ncsf_EventExposure indicates the granularity, duration, and periodicity of the service as requested by the consumer NF. Ncsf is a service that is used for clock signal/data transfer between the CSF and another NF.

Figure 5:
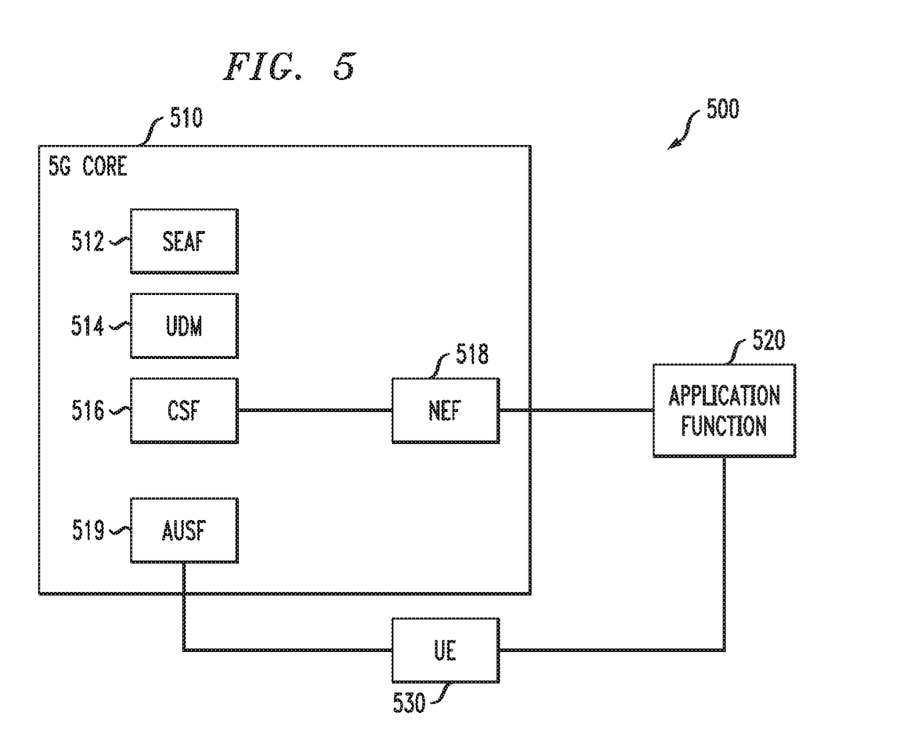
FIG. 5 illustrates a network architecture for exposing a clock services function, according to one or more illustrative embodiments.
Figure 6:
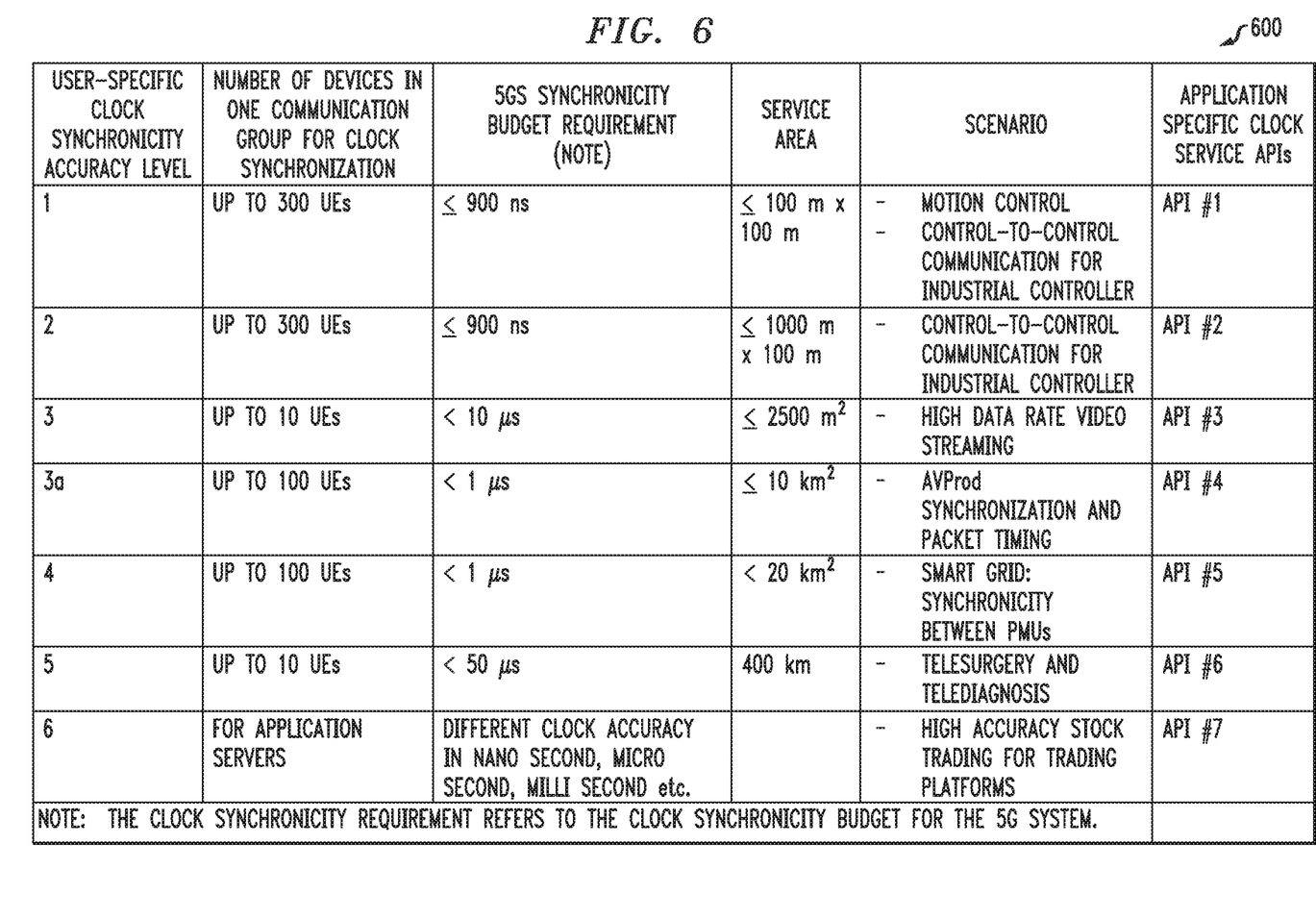
FIG. 6 illustrates a table of clock service performance specifications, according to one or more illustrative embodiments.

FIG. 5 illustrates a network architecture 500 for exposing CSF, according to one or more illustrative embodiments. More particularly, FIG. 5 illustrates at least a part of a 5G core network (CN) 510 with SEAF 512, UDM 514, CSF 516, NEF 518, and AUSF 519. NEF 518 is operatively coupled to CSF 516 and an external third-party Application Function (AF) 520. The UE 530 may be or may not be operatively coupled to AF 520. Both the UE 530 and external third-party AF 520 (although not expressly shown) are coupled to AUSF 519. As shown, NEF 518 provides an interface for CSF 516 in 5G Core 510 with the AF 520 and thus also with the UE 530. Devices connected to the network, such as UE 530, may receive the clock signals from CSF 516 directly over the user plane or control plane of the network.

It is to be appreciated that, in accordance with one or more illustrative embodiments, defined clock synchronization services in the above-referenced TS 22.104 based on performance requirements are offered to authorized UEs and application servers using a CSF application programming interface (API). The API may include different attributes to specify accuracy (e.g., nanosecond, microsecond, millisecond, second), interval, and other characteristics to meet different timing key performance indicators. Alternatively, in one or more other embodiments, different APIs are used to invoke different clock services, as in FIG. 6 which illustrates a table 600 of clock service performance specifications for CSF.

Figure 7:
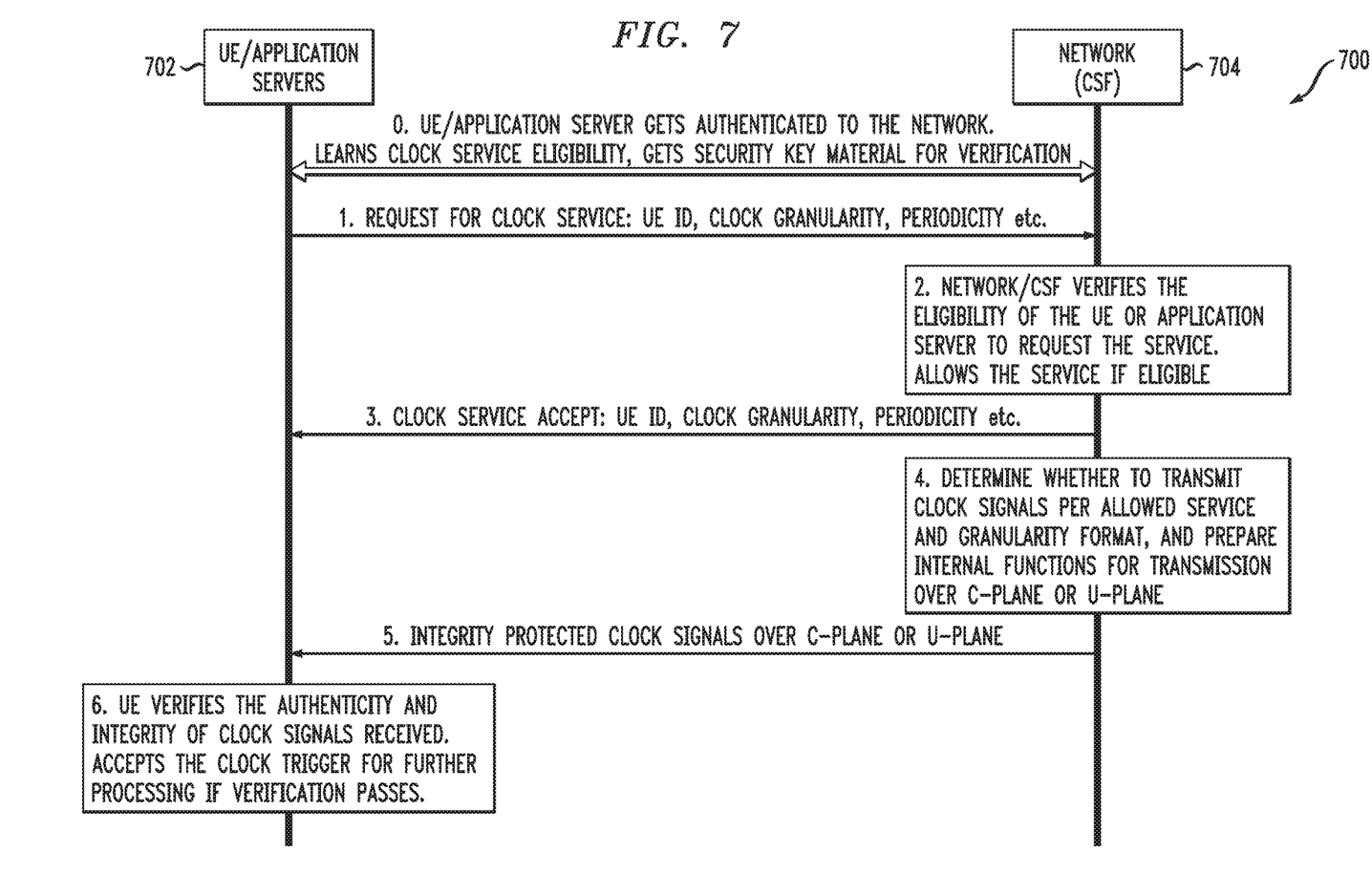
FIG. 7 illustrates a methodology for providing a secure clock services function to user equipment and/or an application function in a communication system, according to one or more illustrative embodiments.

FIG. 7 illustrates a methodology 700 for providing a clock service function to user equipment and/or an application function in a communication system, according to one or more illustrative embodiments. More particularly, methodology 700 provides integrity-protected clock message signals to UEs and/or external Application Server (application function) 702 via a Network (CSF) 704 (i.e., "Network (CSF)" meaning a CSF in the 5G core network).

As shown, in step 0, UE/Application Server 702 (more generally, requesting device) gets authenticated to the network for service, e.g., using any suitable authentication protocol defined in the above-referenced 3GPP TS 33.501. During this step, UE/Application Server 702 also learns clock service eligibility along with security material to verify the authenticity of the clock source and integrity of the clock signals. Different network elements such as AUSF, SMF and AMF learn the identity and eligibility of the UE/Application Server 702 for the clock service in this step also.

As shown, in step 1, UE/Application Server 702 (more generally, requesting device) sends a Request for Clock Service message with message parameters including, but not limited to, UE identifier (ID), clock granularity, and periodicity to Network (CSF) 704. Note that clock granularity and periodicity refer to specifications for the clock source being requested.

In step 2, the Network (CSF) 704 verifies the eligibility of the UE or Application Server 702 to request the service. The Network (CSF) 704 allows the service if it is eligible based on the subscription information or eligibility criteria provided by the SMF and denies it if it is not eligible.

In step 3, the Network (CSF) 704 sends a Clock Service Accept message with message parameters including, but not limited to, UE ID, clock granularity, periodicity to the UE/Application Server 702.

In step 4, the Network (CSF) 704 decides on transmission of clock signals per the allowed service and its granularity format, etc. and prepares the internal functions for the transmission over the Control Plane (C-Plane) or the User Plane (U-Plane).

In step 5, the Network (CSF) 704 sends authenticated and integrity-protected clock signals over the C-Plane or the U-Plane to the UE/Application Server 702. The signals contain additional fields to verify the authenticity of the clock source such as, for example, a message authentication code (MAC) generated from the shared key material during the network authentication phase in step 0 for the verification of the authenticity and integrity of the message containing the clock signal (and thus the clock signals).

In step 6, the UE/Application Server 702 verifies the authenticity and integrity of the received clock signals using the security key material received during the network authentication phase in step 0. The UE/Application Server 702 accepts the clock trigger for further processing if the verification passes.

Advantageously, illustrative embodiments provide a new service (CSF) offering clock signals as a service in a 5G system by: defining a network framework in 5G to define clock as service; requirements for defining the clock service, both for network and for the client devices; architectural components for the clock service; a security framework to offer to authenticate the device clients to request and receive from the network and receive the clock service in a secure manner; a mechanism to verify the integrity of received clock signals by the client; APIs for different clock services, to request different clock granularity and periodicity of signals; define an interface to offer clock services to third party application servers; and an authentication framework to offer the clock services to third party application servers.

The particular processing operations and other system functionality described in conjunction with the diagrams described herein are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the various embodiments described herein are presented by way of illustrative example only and should not be construed as limiting the scope of the claims. For example, alternative embodiments can utilize different communication system configurations, user equipment configurations, base station configurations, provisioning and usage processes, messaging protocols and message formats than those described above in the context of the illustrative embodiments. These and numerous other alternative embodiments within the scope of the appended claims will be readily apparent to those skilled in the art.

What is claimed is:

1. An apparatus comprising:
at least one processor;
at least one memory including computer program code;
the at least one memory and the computer program code being configured to, with the at least one processor, cause the apparatus at least to:
participate in a bi-directional authentication with a network entity in a communication network;
send a clock service request message to the network entity;
receive a clock service accept message in response to the clock service request message when the apparatus is eligible to use a clock service; and
receive one or more secure clock signals from the network entity.

2. The apparatus of claim 1, wherein the at least one memory and the computer program code being configured to, with the at least one processor, further cause the apparatus to verify the one or more secure clock signals.

3. The apparatus of claim 2, wherein the at least one memory and the computer program code being configured to, with the at least one processor, further cause the apparatus to utilize the one or more secure clock signals in response to the one or more secure clock signals being verified.

4. The apparatus of claim 1, wherein the clock service request message comprises one or more of a requested clock granularity parameter and a requested clock periodicity parameter.

5. The apparatus of claim 1, wherein the one or more received secure clock signals are one or more of integrity-protected and authenticated.

6. The apparatus of claim 1, wherein the apparatus is part of user equipment.

7. The apparatus of claim 1, wherein the apparatus is part of an application server.

8. The apparatus of claim 1, wherein the clock service request message specifies at least one application programming interface associated with the network entity.

9. A method comprising:
participating in a bi-directional authentication with a network entity in a communication network;
sending a clock service request message to the network entity;
receiving a clock service accept message in response to the clock service request message when the apparatus is eligible to use a clock service; and
receiving one or more secure clock signals from the network entity.

10. The method of claim 9, further comprising verifying the one or more secure clock signals.

11. The method of claim 10, further comprising utilizing the one or more secure clock signals in response to the one or more secure clock signals being verified.

12. The method of claim 9, wherein the clock service request message comprises one or more of a requested clock granularity parameter and a requested clock periodicity parameter.

13. The method of claim 9, wherein the one or more received secure clock signals are one or more of integrity-protected and authenticated.

14. The method of claim 9, wherein the clock service request message specifies at least one application programming interface associated with the network entity.

15. An article of manufacture comprising a non-transitory computer-readable storage medium having embodied therein executable program code that when executed by a processor causes the processor to perform the steps of:
- participating in a bi-directional authentication with a network entity in a communication network;
- sending a clock service request message to the network entity;
- receiving a clock service accept message in response to the clock service request message when the apparatus is eligible to use a clock service; and
- receiving one or more secure clock signals from the network entity.

16. The article of claim 15, further comprising verifying the one or more secure clock signals.

17. The article of claim 15, further comprising utilizing the one or more secure clock signals in response to the one or more secure clock signals being verified.

18. The article of claim 15, wherein the clock service request message specifies at least one application programming interface associated with the network entity.

19. An apparatus comprising:
- at least one processor;
- at least one memory including computer program code;
- the at least one memory and the computer program code being configured to, with the at least one processor, cause the apparatus at least to:
  - participate in a bi-directional authentication with a requesting device in a communication network;
  - receive a clock service request message from the requesting device;
  - verify the eligibility of the requesting device to request a clock service; and
  - send one or more secure clock signals to the requesting device in response to successfully verifying the requesting device.

20. The apparatus of claim 19, wherein the at least one memory and the computer program code being configured to, with the at least one processor, further cause the apparatus to enable different interfaces for different service levels specified in the clock service request message.

21. The apparatus of claim 20, wherein the different interfaces respectively correspond to different signal accuracy levels.

22. The apparatus of claim 19, wherein sending the one or more secure clock signals to the requesting device further comprises sending the one or more secure clock signals on one of a user plane and a control plane of the communication network.

23. The apparatus of claim 19, wherein the at least one memory and the computer program code being configured to, with the at least one processor, further cause the apparatus to secure the one or more clock signals by one or more of authentication and integrity-protection.

24. A method comprising:
- participating in a bi-directional authentication with a requesting device in a communication network;
- receiving a clock service request message from the requesting device;
- verifying the eligibility of the requesting device to request a clock service; and
- sending one or more secure clock signals to the requesting device in response to successfully verifying the requesting device.

25. The method of claim 24, further comprising enabling different interfaces for different service levels specified in the clock service request message.

26. The method of claim 24, wherein the further comprising securing the one or more clock signals by one or more of authentication and integrity-protection.

27. The method of claim 24, further comprising exposing the clock service over a specified one of a plurality of types of access interfaces supported by the communication network.

28. An article of manufacture comprising a non-transitory computer-readable storage medium having embodied therein executable program code that when executed by a processor causes the processor to perform the steps of:
- participating in a bi-directional authentication with a requesting device in a communication network;
- receiving a clock service request message from the requesting device;
- verifying the eligibility of the requesting device to request a clock service; and
- sending one or more secure clock signals to the requesting device in response to successfully verifying the requesting device.

* * * * *